Oct. 20, 1925.
G. B. REISBACH
CONVEYER
Filed Nov. 26, 1920      2 Sheets-Sheet 1
1,557,944
Fig. 1.
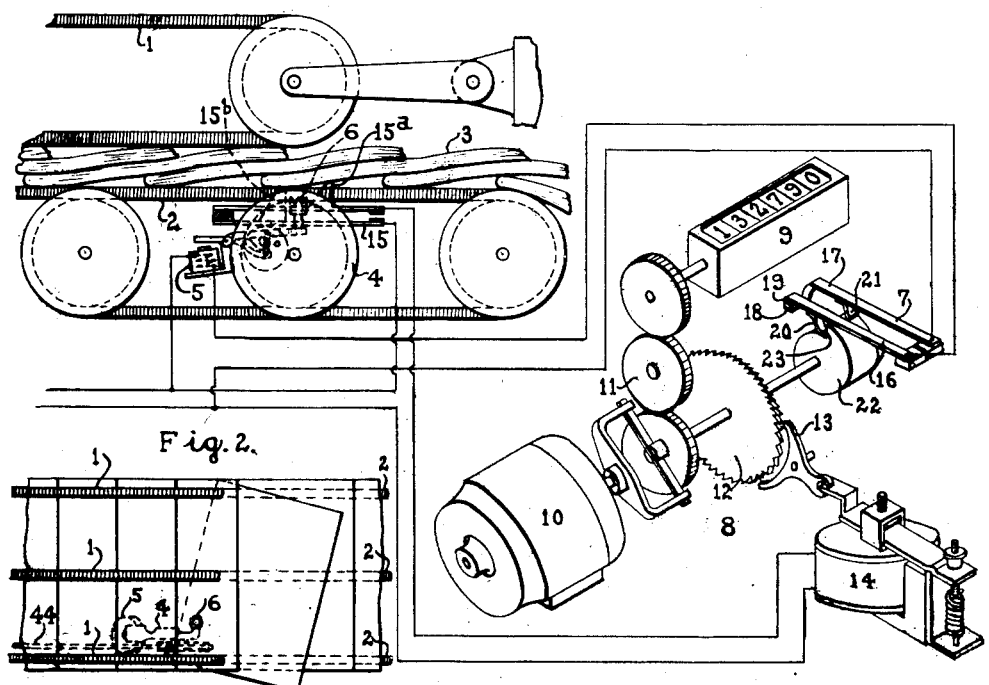
Fig. 2.
Fig. 3.
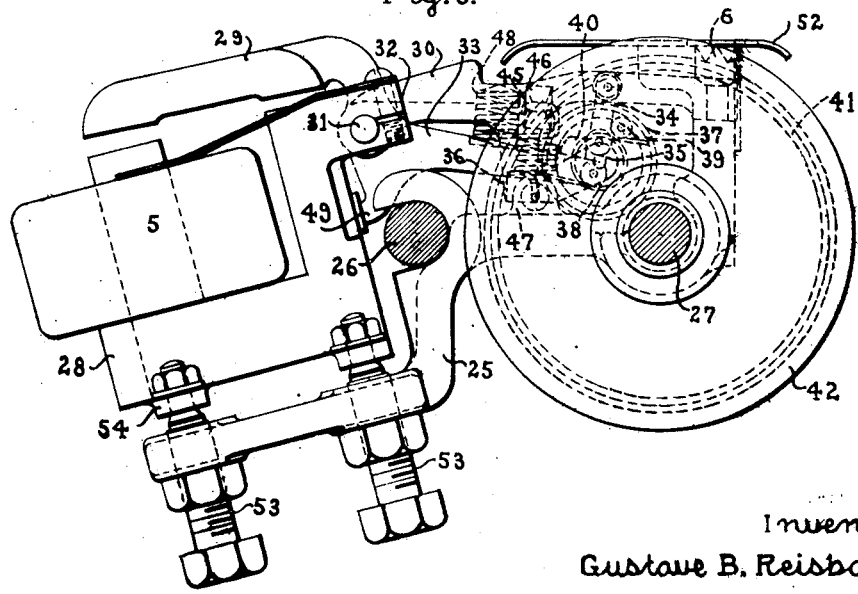
Inventor
Gustave B. Reisbach
By
Attorney Oct. 20, 1925.
G. B. REISBACH
1,557,944
CONVEYER
Filed Nov. 26, 1920      2 Sheets-Sheet 2
Fig. 4.
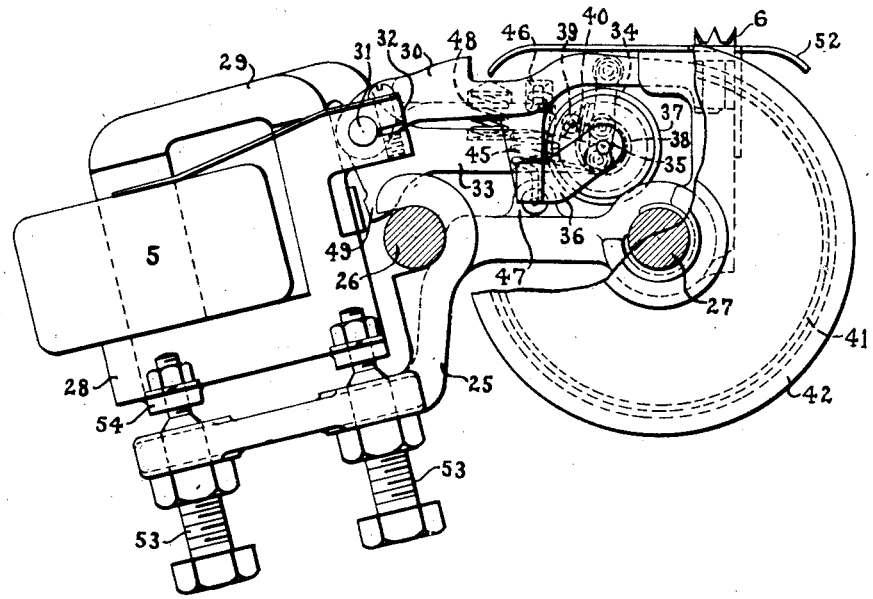
Fig. 5.
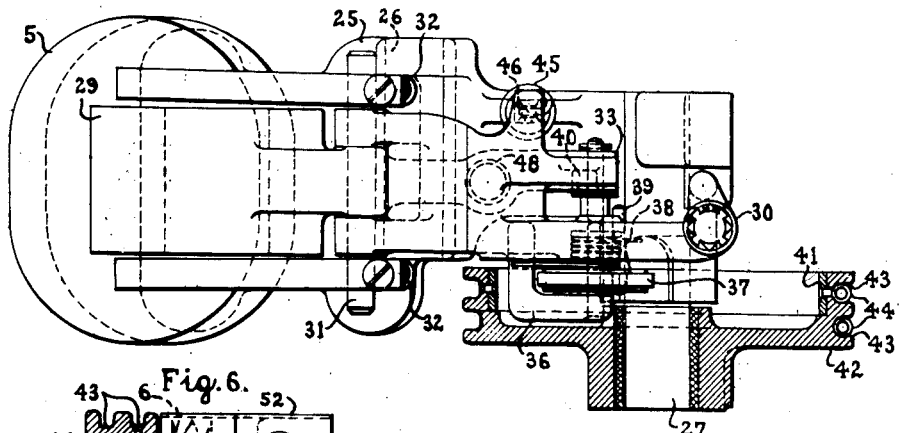
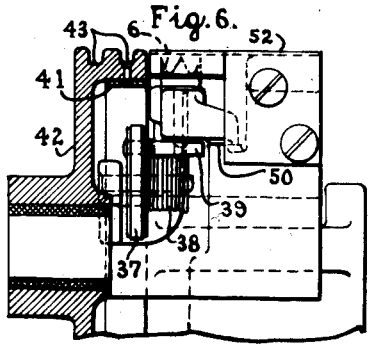
Fig. 6.
Inventor
Gustave B. Reisbach
By Frank H. Hubbard
Attorney Patented Oct. 20, 1925.

1,557,944

UNITED STATES PATENT OFFICE.

GUSTAVE B. REISBACH, OF MILWAUKEE, WISCONSIN, ASSIGNOR TO THE CUTLER-HAMMER MFG. CO., OF MILWAUKEE, WISCONSIN, A CORPORATION OF WISCONSIN.

CONVEYER.

Application filed November 26, 1920. Serial No. 426,339.

*To all whom it may concern:*

Be it known that I, GUSTAVE B. REISBACH, a citizen of the United States, residing at Milwaukee, in the county of Milwaukee and State of Wisconsin, have invented new and useful Improvements in Conveyers, of which the following is a full, clear, concise, and exact description, reference being had to the accompanying drawing, forming a part of this specification.

This invention relates to conveyers and more particularly to devices for dividing the articles carried by the conveyer into predetermined groups.

Such devices have been used in connection with printing presses and heretofore the same were controlled by the press and were adapted to divide the newspapers in groups only immediately upon delivery thereof from the press. Accordingly, these devices do not insure accurate grouping of the newspapers at the delivery table of a conveyer since papers are very often removed at the press or from the conveyer between the press and the delivery table.

The present invention has among its objects to provide apparatus adapted to group the newspapers or other articles at the delivery table of the conveyer or other preferred point.

A further object is to provide means under the control of the articles carried by the conveyer to engage and effect deflection of one of the articles upon movement of a given number past a given point.

A further object is to provide a device adapted to engage an article on the conveyer to deflect the same and adapted to release the article upon a given travel of the conveyer.

Various other objects and advantages will hereinafter appear.

The accompanying drawings illustrate one embodiment of the invention and the same will now be described, it being understood that the invention is susceptible of various modifications without departing from the scope of the appended claims.

In the drawing,

Figures 1 and 2 are diagrammatic views showing apparatus embodying the invention in conjunction with a newspaper conveyer.

Fig. 3 is a side elevational view of a device which is diagrammatically illustrated in Fig. 1.

Fig. 4 is a side elevational view of the device shown in Fig. 3, with parts broken away, illustrating the same in another position.

Fig. 5 is a plan view of the device shown in Fig. 3 parts of the same being removed and other parts being shown in section; and Fig. 6 is a fragmentary end view of certain parts of the device shown in Fig. 3.

Referring to Fig. 1, the same shows diagrammatically a section of a newspaper conveyer comprising belts 1 and 2 carrying therebetween a number of newspapers 3 arranged in an overlapped relation. Further, this view shows diagrammatically a device 4 arranged below the conveyer and at one side thereof said device having a winding 5 and a prong 6 adapted to be projected by said winding to engage certain of the papers on the conveyer to deflect the same as shown in Fig. 2. Winding 5 is controlled by a switch 7 associated with a counting device 8 of the character disclosed in my copending application Serial No. 325,468, filed Sept. 22, 1919.

As set forth in said application counting device 8 includes a counter 9, a motor 10 for driving said counter through a suitable gearing 11, a ratchet wheel 12 and pawl 13 forming an escapement for controlling operations of said counter, an electromagnet 14 for controlling said escapement pawl and a switch 15 engageable with and operable by the newspapers on the conveyer to control the circuit of electromagnet 14. Switch 15 comprises upper and lower spring contacts which are respectively provided with upstanding lugs 15$^a$ and 15$^b$ to engage the papers on the conveyer and the arrangement is such that each paper in passing over said lugs causes switch 15 to make and break circuit of the electromagnet 14 thereby permitting a counting operation of counter 9 by the motor 10 which is preferably continuously energized.

The switch 7 comprises two leaf springs 16 and 17 fixed at one end to a suitable support but insulated from one another and carrying at their free ends engageable contacts 18 and 19. The springs are respectively provided with downwardly projecting lugs 20 and 21 to bear against the insulated surface of a cam 22 rotatable with ratchet wheel 12, lug 20 being arranged to the left of lug 21. Cam 22 is provided with an abrupt shoulder 23 and during each revolution thereof in a clockwise direction the downwardly extending lug 20 of spring 16 drops over said shoulder to effect engagement of contacts 18 and 19 and thereafter lug 21 drops over said shoulder to effect disengagement of said contacts. Thus it is apparent that with the circuit connections shown in Fig. 1 winding 5 will be energized to project prong 6 for deflection of a newspaper on the conveyer upon passage of a given number of newspapers over switch 15 said number being determined by the number of teeth on ratchet wheel 12. Prong 6 is so positioned that the same engages the paper which effects projection thereof and upon movement of said paper out of engagement with the lug 15$^b$, switch 15 effects operation of device 8 which causes lug 21 to drop over shoulder 23 to effect de-energization of winding 5.

Referring now to Fig. 3, the device 4 includes a supporting bracket 25 having openings therein to receive supporting shafts 26 and 27 which can be secured to the framework of the conveyer in any suitable manner. Winding 5 is provided with a U-shaped magnet frame 28 which is adjustably secured to frame 25 as hereinafter set forth, and carries an armature member 29 for said winding and in operating member 30 for prong 6. Members 29 and 30 are rotatable on a pin 31 supported by bearings 32 arranged on opposite sides of magnet frame 28 and the former has a projecting arm 33 arranged below the latter. Prong 6 is rotatably mounted on the free end of member 30 and said member is connected to arm 33 by a toggle including links 34 and 35 the former being connected to member 30 at a point removed from the end thereof and the latter to the end of arm 33. As best shown in Fig. 4, member 30 has a downwardly extending angular lug 36 having a roller 37 rotatably mounted on the extremity thereof.

Roller 37 is biased to move in a counterclockwise direction by a coil spring 38 and carries a projecting pin 39 which is normally in the position shown in Fig. 3 to hold toggle member 35 against a fixed stop 40 on arm 33 in which position toggle member 35 is in substantial alignment with toggle member 34. Roller 37 is arranged to engage an internal friction surface 41 in a pulley 42 upon upward movement of member 30. Pulley 42 is rotatably mounted on shaft 27 and is provided with circumferential grooves 43 to receive spring belts 44 which can be driven from a roller of the conveyer as shown in Figs. 1 and 2. Member 30 is biased downwardly by a spring 45 connected between a lug 46 on said member and a lug 47 on said bracket, while arm 33 is biased downwardly to disengage armature 29 from magnet frame 28 by a relatively weaker spring 48 located between said arm and member 30. Outward movement of armature 29 is limited by a stop 49 which engages the side of the magnet frame 28 and downward movement of member 30 is limited by fixed stop 50 shown in Fig. 6.

Assuming the parts to be in the position shown in Fig. 3, it is apparent that upon energization of winding 5 armature member 29 is attracted and the arm 33 thereof acts through the alinged toggle members 34 and 35 to lift member 30 against the action of spring 45 for projection of prong 6. Upon upward movement of the prong 6 roller 37 is moved into engagement with the internal friction surface 41 and immediately upon engagement of said roller with said surface the former is driven in clockwise direction until the pin 39 carried thereby engages the left side of link 34 and moves said link out of alignment with link 35. Spring 45 thereupon moves member 30 downwardly for retraction of prong 6. Thus it is apparent that provision is made for retracting prong 6 upon a given movement of the conveyer such movement being dependent upon the relative diameters of roller 37 and internal friction surface 41. Upon retraction of prong 6 roller 37 disengages friction surface 41 and is rotated in a counterclockwise direction by spring 38 until pin 39 engages the right side of link 34 and upon de-energization of winding 5 arm 33 moves downwardly under the action of spring 48 whereupon the toggle members 34 and 35 are returned to the position shown in Fig. 3. It will be understood that the spring 38 effects resetting of the toggle members 34 and 35 only upon release of armature 29.

To maintain the newspapers on the conveyer in proper relation with respect to prong 6 bracket 25 is provided with a shield 52. Also the magnet frame 28 is provided with means for adjusting the same on bracket 25 to vary the air gap between armature 29 and the pole face of frame 28. Said means includes bolts 53 passing through threaded openings in bracket 25 from the underside of the latter and having their upper ends secured to lugs 54 on magnet frame 28.

What I claim as new and desire to secure by Letters Patent is:

1. The combination with a conveyer, of means under the control of the articles carried by said conveyer to engage and effect deflection of certain of the articles upon movement of a given number of such articles past a given point, said means including means to insure a predetermined degree of deflection of such articles under conditions of variation in dimensions or spacing of the articles.

2. The combination with a conveyer of means under the control of the articles carried by said conveyer to engage and effect deflection of certain of the articles upon movement of a given number of such articles past a given point, said means being also controlled by said conveyer to render the period of engagement thereof with any article subject to control by the travel of the conveyer.

3. The combination with a conveyer of a device periodically operable for engaging an article on said conveyer to effect deflection thereof, means under the control of the articles on said conveyer for rendering said device operative upon movement of a given number of such articles past a given point and means driven by said conveyer for rendering the period of engagement of said device with any article proportional to the travel of the conveyer and independently of the spacing of said articles.

4. The combination with a conveyer, of a member to be projected to engage certain of the articles on said conveyer to deflect the same, means for projecting said member upon movement of a given number of articles past a given point and means associated with said former means for retracting said member when the article engaged thereby is deflected to a given degree.

5. The combination with a conveyer of a member to be projected to engage certain of the articles on said conveyer to deflect the same and means for projecting said member upon movement of a given number of articles past a given point and for retracting the same upon a given movement of said conveyer irrespective of the spacing of said articles.

6. The combination with a conveyer of a member to be projected to engage certain of the articles on said conveyer to deflect the same, power operating means for said member, and a releasable operative connection between said member and said means adapted to connect said member to said means for projection thereby and to be tripped by said conveyer for retraction of said member.

7. The combination with a conveyer, of a member to be projected to engage certain of the articles on said conveyer to deflect the same, a winding, an armature to be attracted by said winding and an operative connection between said armature and said member adapted to project said member upon attraction of said armature and adapted to be tripped to permit retraction of said member.

8. The combination with a conveyer, of a member to be projected to engage certain of the articles on said conveyer to deflect the same, a winding, an armature to be attracted by said winding, a toggle between said armature and said member adapted to project said member upon attraction of said armature and means for tripping said toggle upon projection of said member and for resetting said toggle upon release of said armature member.

9. The combination with a conveyer, of a movable member having a prong thereon to be projected to retard certain of the articles on the conveyer, a winding, an armature to be attracted thereby, a toggle connecting said armature and said member, and means for tripping and resetting said toggle including a part driven by said conveyer and a part carried by said member and movable into and out of engagement with said former part upon projection and retraction of said prong.

10. The combination with a conveyer, of a member to be projected to engage certain of the articles on said conveyer to deflect the same and to be retracted to release such articles, power operated means having a movable operating part and an operative connection between said part and said member adapted to connect said member to said part for projection thereby and adapted to be tripped to free said member from said part for substantially instantaneous retraction of said member.

11. The combination with a conveyer, of a member to be projected to engage certain of the articles on said conveyer to deflect the same and to be retracted to release such articles, power operated means having a reciprocatory operating part and a toggle connection between said member and said part adapted upon movement of said part in one direction to project said member and adapted to be tripped to free said member from said part for substantially instantaneous retraction thereof.

12. The combination with a conveyer, of a member to be projected to engage certain of the articles on said conveyer to deflect the same and to be retracted to release such articles, an electromagnetic operating device for said member including a reciprocatory armature a toggle connection between said armature and said member adapted upon attraction of said armature to project said member and means for tripping said toggle to permit substantially instantaneous retraction of said member and to reset said toggle upon release of said armature.

13. The combination with a conveyer, of a member to be projected to engage certain of the articles on said conveyer to deflect the same and to be retracted to release such articles, power operated means having a reciprocatory operating part, a toggle connection between said member and said part adapted to project said member upon movement of said part in one direction and adapted to be tripped to free said member from said part for substantially instantaneous retraction thereof, and tripping means for said toggle including co-operating friction members one being driven by the conveyer and the other being movable into and out of frictional engagement therewith upon projection and retraction of said member, said latter friction member being biased towards a position for resetting said toggle and being driven upon engagement with the former to trip said toggle upon a given movement of said conveyer.

14. In a bunching device for newspapers and like articles, the combination with a conveyer for moving said articles in spaced relation to each other, a circuit making and breaking device comprising a pair of resilient projections in the path of said articles adapted to be successively engaged by and successively disengaged from the latter, a power operated counter controlled by said device, a prong interposed between said projections and controlled by said counter for engaging and holding a portion of one of said articles after a predetermined operation of said counter, and means for effecting disengagement of said prong after a predetermined travel of said conveyer irrespective of the spacing of said articles.

In witness whereof, I have hereunto subscribed my name.

GUSTAVE B. REISBACH.